United States Patent
Nakamura et al.

(10) Patent No.: US 8,911,610 B2
(45) Date of Patent: Dec. 16, 2014

(54) PROCESS FOR PRODUCING METALLIC LITHIUM

(75) Inventors: Eiji Nakamura, Kobe (JP); Hiroaki Takata, Kobe (JP); Yukihiro Yokoyama, Kobe (JE); Hiroshi Miyamoto, Kobe (JP)

(73) Assignee: Santoku Corporation, Hyogo (JP)

( * ) Notice: Subject to any disclaimer, the term of this patent is extended or adjusted under 35 U.S.C. 154(b) by 0 days.

(21) Appl. No.: 13/608,561

(22) Filed: Sep. 10, 2012

(65) Prior Publication Data
US 2013/0001097 A1    Jan. 3, 2013

Related U.S. Application Data

(63) Continuation of application No. 12/513,030, filed as application No. PCT/JP2007/071374 on Nov. 2, 2007, now abandoned.

(30) Foreign Application Priority Data

Nov. 2, 2006    (JP) ................................ 2006-298328

(51) Int. Cl.
C25C 3/02    (2006.01)
C01D 15/04    (2006.01)

(52) U.S. Cl.
CPC .. *C01D 15/04* (2013.01); *C25C 3/02* (2013.01)
USPC ............................ 205/407; 204/245; 204/247

(58) Field of Classification Search
USPC ....................................................... 205/407
See application file for complete search history.

(56) References Cited

U.S. PATENT DOCUMENTS

| | | | |
|---|---|---|---|
| 2,752,299 A | 6/1956 | Cooper | |
| 2,968,526 A | 1/1961 | Verdieck et al. | |
| 3,024,082 A | 3/1962 | Colton | |
| 3,344,049 A * | 9/1967 | Thieler et al. | 205/407 |
| 4,487,677 A | 12/1984 | Murphy | |
| 4,699,704 A | 10/1987 | Ishizuka | |
| 4,980,136 A | 12/1990 | Brown et al. | |

(Continued)

FOREIGN PATENT DOCUMENTS

| | | |
|---|---|---|
| JP | 59-200731 A | 11/1984 |
| JP | 61-186489 A | 8/1986 |

(Continued)

OTHER PUBLICATIONS

English Abstract and Partial Translation of JP 01-152226A.*

(Continued)

*Primary Examiner* — Bryan D. Ripa
(74) *Attorney, Agent, or Firm* — Sughrue Mion, PLLC

(57) ABSTRACT

Provided is a safe and efficient method for producing lithium metal which facilitates efficient production of anhydrous lithium chloride without corrosion of the system materials by chlorine gas or molten lithium carbonate, and which allows production of lithium metal by molten salt electrolysis of the produced anhydrous lithium chloride as a raw material. The method includes the steps of (A) contacting and reacting lithium carbonate and chlorine gas in a dry process to produce anhydrous lithium chloride, and (B) subjecting the raw material for electrolysis containing the anhydrous lithium chloride to molten salt electrolysis under such conditions as to produce lithium metal, wherein the chlorine gas generated by the molten salt electrolysis in step (B) is used as the chlorine gas in step (A) to continuously perform steps (A) and (B).

8 Claims, 3 Drawing Sheets

(56) References Cited

U.S. PATENT DOCUMENTS

| | | | |
|---|---|---|---|
| 4,988,417 A | | 1/1991 | DeYoung |
| 5,089,094 A | * | 2/1992 | Ogasawara et al. ............ 205/405 |
| 5,665,220 A | | 9/1997 | Sharma |
| 6,328,818 B1 | * | 12/2001 | Miyagi et al. .................. 148/232 |
| 2006/0219053 A1 | | 10/2006 | Ogasawara et al. |

FOREIGN PATENT DOCUMENTS

| | | | |
|---|---|---|---|
| JP | 1-152226 A | | 6/1989 |
| JP | 01152226 A | * | 6/1989 |
| RU | 2 116 251 C1 | | 7/1998 |

OTHER PUBLICATIONS

"Youyuen Netsugijutsu no Kiso (Basics of Molten Salt Thermal Technology)", written and edited by the Society of Molten-Salt Thermal Technology, 1993, p. 97, Published by Agne Gijutsu Center.

Yasuhiko Ito, "Youyuen no Ouyou (Applications of Molten Salt)", 2003, p. 305, published by Industrial Publishing & Consulting, Inc.

English translation of the International Preliminary Report on Patentability.

* cited by examiner

PROCESS FOR PRODUCING METALLIC LITHIUM

CROSS REFERENCE TO RELATED APPLICATIONS

This application is a continuation application of U.S. application Ser. No. 12/513,030 filed May 29, 2009, which is a U.S. National Stage Application of PCT/JP2007/071374 filed Nov. 2, 2007, which claims benefit of Japanese Application 2006-298328 filed Nov. 2, 2006. The above-noted applications are incorporated herein by reference in their entirety.

FIELD OF ART

The present invention relates to a method for producing lithium metal by molten salt electrolysis, in particular, a method for producing lithium metal which allows continuous operation of molten salt electrolysis along with the production of anhydrous lithium chloride as a raw material for the electrolysis.

BACKGROUND ART

Anhydrous lithium chloride is used as a raw material in molten salt electrolysis for production of lithium metal, or a desiccant. As a method for producing anhydrous lithium chloride, for example, Patent Publication 1 discloses reaction of lithium hydroxide with hydrochloric acid for producing a high purity product, and Patent Publication 2 discloses reaction of lithium carbonate suspended in water with chlorine gas in the presence of an iron-nickel catalyst.

Both of these methods inevitably include dehydrating and drying of the resulting lithium chloride for obtaining anhydrous lithium chloride, which requires additional costs for operation and facility.

Patent Publication 3 discloses a method for producing anhydrous lithium chloride by reacting chlorine gas with lithium hydroxide. The raw material lithium hydroxide, which is strongly alkaline, irritates eyes, skin, and mucosa, and is easily stirred up when, in particular, the reaction is performed in a dry process, which causes difficulties in handling and additional costs for operation and facility.

When lithium carbonate in the form of molten salt, which is highly corrosive to metal materials, is used in the production of anhydrous lithium chloride, severe limitation is imposed on the materials which may be used for the reaction vessel or piping (Non-patent Publications 1 and 2). In addition, the heat resistance of the reaction vessel should also be considered in view of the high temperature of the molten salt. On the other hand, for the production of anhydrous lithium chloride using chlorine gas, which is also corrosive, there are hardly any metal materials that could be used in the chlorine gas atmosphere beyond 500° C. Instead, ceramics and the like materials which withstand high temperature, corrosive environment, need to be employed for the reaction vessel and piping.

Molten salt electrolysis has been employed for producing lithium metal, and attempts have conventionally been made to use inexpensive lithium carbonate as a lithium source. However, lithium carbonate is not in use in commercial production at present because the graphite anode-consuming electrolytic reaction ($2Li_2CO_2+C \rightarrow 4Li+3CO_2$) is the main reaction, and the lithium metal resulting from the electrolysis reacts with lithium carbonate ($Li_2CO_3+4Li \rightarrow 3Li_2O+C$) in the electrolyte to obstruct continuous electrolysis.

In view of the above problems, it is the current practice to produce lithium metal from anhydrous lithium chloride as a lithium source by molten salt electrolysis.

Patent Publication 4 discloses a method of molten salt electrolysis using anhydrous lithium chloride, wherein lithium carbonate is introduced onto the surface of the bath around the anode to cause the reaction $2Li_2CO_2+2Cl_2 \rightarrow 4LiCl+2CO_2+O_2$, to thereby generate anhydrous lithium chloride and allow continuous electrolysis.

Patent Publication 5 discloses a method of molten salt electrolysis using anhydrous lithium chloride, wherein lithium carbonate and charcoal or the like as a carbon source are simultaneously introduced into the anode compartment to cause the reaction $2Li_2CO_2+2Cl_2+C \rightarrow 4LiCl+3CO_2$, to thereby prevent consumption of the anode.

The methods disclosed in Patent Publications 4 and 5 do not solve the problem of reaction between the lithium metal resulting from electrolysis and lithium carbonate discussed above. Thus these methods have difficulties in the control of carbonate concentration and various problems in operation, such as declined current efficiency, black foam, and short circuit.

Patent Publication 6 discloses a method including the steps of extracting a part of a mixed molten salt of the electrolyte containing anhydrous lithium chloride outside the electrolytic cell, introducing the extracted molten salt into a chlorinating furnace, adding lithium carbonate and a chlorinating agent thereto, reacting the molten lithium carbonate and the chlorinating agent, and returning the resulting anhydrous lithium chloride to the electrolytic cell for use as a raw material. This method has difficulties in controlling the concentration of the electrolyte, requires circulation facilities, and is not practical in view of safety.

Patent Publication 7 discloses an electrolysis method wherein the anode compartment is separated from the cathode compartment with a porous electrically nonconductive partition, lithium carbonate is introduced into the anode compartment, and only the lithium ions are delivered to the cathode compartment to deposit lithium metal. This method requires a high temperature, the current efficiency is low, and the corrosion resistance of the nonconductive partition should be attended to.

Patent Publication 1: U.S. Pat. No. 4,980,136-A1
Patent Publication 2: RU-2116251-C1
Patent Publication 3: U.S. Pat. No. 2,968,526-A1
Patent Publication 4: U.S. Pat. No. 3,344,049-A1
Patent Publication 5: JP-59-200731-A
Patent Publication 6: JP-1-152226-A
Patent Publication 7: U.S. Pat. No. 4,988,417-A1
Non-patent Publication 1: "Youyuen Netsugijutsu no Kiso (Basics of Molten Salt Thermal Technology)", written and edited by The Society of Molten-Salt Thermal Technology, published by Agne Gijutsu Center (1993), p 97
Non-patent Publication 2: "Youyuen no Ouyou (Applications of Molten Salt)", written and edited by Yasuhiko ITO, published by Industrial Publishing & Consulting, Inc. (2003), p 305

SUMMARY OF THE INVENTION

It is an object of the present invention to provide a safe and efficient method for producing lithium metal which facilitates efficient production of anhydrous lithium chloride without corrosion of the system materials by chlorine gas or molten lithium carbonate, which allows production of lithium metal by molten salt electrolysis of the produced anhydrous lithium chloride as a raw material, and which utilizes chlorine gas generated by the molten salt electrolysis for producing the raw material anhydrous lithium chloride without discharging the chlorine gas outside the system.

According to the present invention, there is provided a method for producing lithium metal comprising the steps of:

(A) contacting and reacting lithium carbonate and chlorine gas in a dry process to produce anhydrous lithium chloride; and (B) subjecting a raw material for electrolysis comprising said anhydrous lithium chloride obtained from step (A) to molten salt electrolysis under such conditions as to produce lithium metal;

wherein chlorine gas generated by said molten salt electrolysis in step (B) is used as said chlorine gas in step (A) to continuously perform steps (A) and (B).

According to the present invention, there is also provided a method for producing anhydrous lithium chloride comprising the step of:

(A) contacting and reacting lithium carbonate and chlorine gas in a dry process.

According to the method of the present invention, by means of step (A), efficient production of anhydrous lithium chloride is facilitated without causing corrosion of the system materials by the chlorine gas and the molten lithium carbonate. Then by means of step (B), lithium metal is produced by molten salt electrolysis of the anhydrous lithium chloride obtained from step (A) as a raw material, while the chlorine gas generated by the molten salt electrolysis is used for producing the raw material anhydrous lithium chloride without discharging the chlorine gas outside the system. Thus the method of the present invention is excellently safe and efficient in producing anhydrous lithium chloride and lithium metal.

PREFERRED EMBODIMENTS OF THE INVENTION

The present invention will now be explained in detail.

The method of the present invention includes step (A) of contacting and reacting lithium carbonate and chlorine gas in a dry process to produce anhydrous lithium chloride. This step (A) allows efficient production of anhydrous lithium chloride, so that this step alone may be a method for producing anhydrous lithium chloride.

The reaction between the lithium carbonate and the chlorine gas in step (A) is effected in a dry process, i.e., by contacting solid lithium carbonate and chlorine gas without a solvent, such as water. Chlorine gas generated by the molten salt electrolysis in step (B) to be discussed later may be used here. When step (A) alone is carried out to produce anhydrous lithium chloride, chlorine gas supplied from a gas cylinder or the like may be used.

The chlorine gas may preferably be at 100% concentration, but may alternatively be mixed with inert gas, such as argon or helium. The lithium carbonate may be in any form without limitation, and preferably in the form of powder, which may further be granulated.

The optimum particle size range of the powdered lithium carbonate for efficient reaction with the chlorine gas in step (A) was determined through an experiment. In the experiment, reactivity of lithium carbonate powders having D90's of 0.02 to 0.82 mm with chlorine gas was determined in the temperature range of 250 to 550° C. D90 represents the particle size at which the cumulative volume fraction is 90% as measured with a laser diffraction particle size analyzer (Microtrac IISRA manufactured by NIKKISO CO., LTD.).

Figure 1:
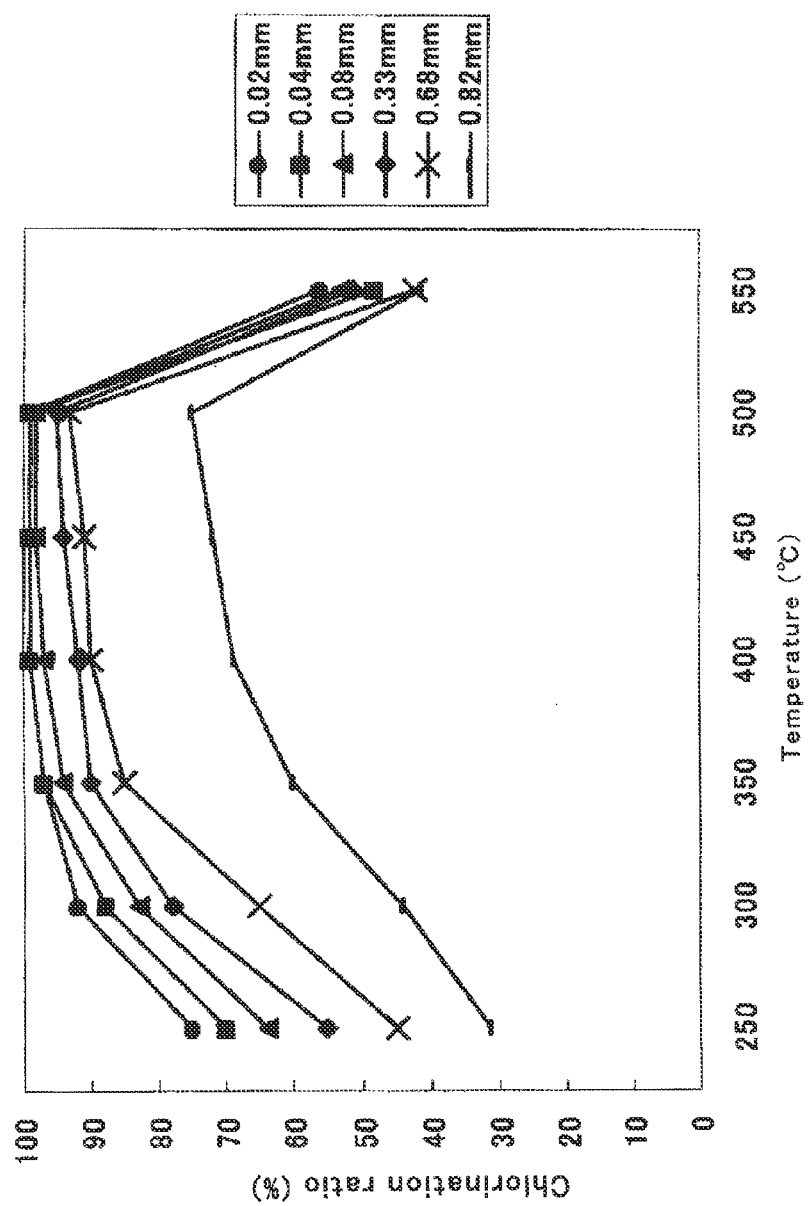
FIG. 1 is a graph showing the relationship between the reaction temperature and the chlorination ratio of the lithium carbonate in powder form at various particle sizes (D90).

A vertical furnace having a cylindrical alumina pipe of 50 mm inner diameter was used. A perforated alumina dish having 5 mm diameter pores at not less than 50% porosity was disposed in the soaking area in the cylindrical pipe, and an air permeable silica cloth was placed on the dish. While argon gas was blown up into the cylindrical pipe at 1.0 L/min, 10 g of lithium carbonate was placed on the cloth and held in the pipe. When the soaking area in the pipe reached the objective temperature, the argon gas was replaced with chlorine gas (3N, 1.0 L/min), and held for 20 minutes. Then the chlorine gas was replaced with argon gas, and the pipe was cooled. When the temperature fell to 100 to 150° C., the reaction product of lithium carbonate and chlorine gas was taken out, and the chlorination ratio was immediately determined. According to "Kagaku Daijiten (Comprehensive Dictionary of Chemistry)" (Kyoritsu Shuppan Co., Ltd., issued Mar. 30, 1960), the solubility of anhydrous lithium chloride and lithium carbonate in water is 67 g and 1.54 g, respectively, in 100 g of water at 0° C., and 127.5 g and 0.73 g, respectively, in 100 g of water at 100° C. Based on this, 10 g of the product of reaction with chlorine gas was dissolved in 50 g of water, and from the weight of the collected precipitate, the chlorination ratio from lithium carbonate to anhydrous lithium chloride was calculated. The results are shown in FIG. 1.

From FIG. 1, it is understood that high chlorination ratios were achieved at reaction temperatures of 350° C. or higher, and that termination of the reaction in a dry process requires a temperature below 506° C., which is the eutectic temperature of the raw material, lithium carbonate, and the product, anhydrous lithium chloride. Accordingly, the temperature suitable for the reaction is not lower than 350° C. and lower than 506° C., preferably not lower than 400° C. and lower than 506° C. Incidentally, X-ray diffraction analysis of the products produced at temperatures below 506° C. detected nothing other than lithium carbonate.

The D90 of the powdered lithium carbonate suitable for the reaction may be not more than 0.70 mm, preferably not more than 0.40 mm, more preferably not more than 0.10 mm.

The reaction discussed above is performed in a solid system without molten lithium carbonate being involved, and at a temperature lower than 506° C. Thus the problem of corrosion of the apparatus may be avoided, and even stainless steel, which is a general-purpose material, may be used for manufacturing the system with sufficient corrosion resistance.

In step (A), the reaction of the lithium carbonate with the chlorine gas may be effected in a fixed, moving, or fluidized bed, and either in a continuous or batch system.

In a moving bed system, by blowing the chlorine gas into the moving lithium carbonate as a counterflow, anhydrous lithium chloride may be produced continuously as a moving bed, which may be continuously drawn out or supplied to step (B) to be discussed later.

For such a moving bed system, it is preferred to granulate powdered lithium carbonate into granules of a uniform size and to stir the reaction system, so that the contact between the lithium carbonate and the chlorine gas is effected smoothly.

In step (A), continuous introduction of the lithium carbonate, reaction with the chlorine gas, and recovery of the resulting anhydrous lithium chloride may be achieved by stirring the lithium carbonate in apparatus of a rotary kiln type while the chlorine gas is blown in a counterflow, or by introducing the lithium carbonate down into a vertical reaction vessel equipped with stirring means while the chlorine gas is blown up in a counterflow. In the latter case, hermetical sealing of the facility may be secured more easily.

In the process of continuously introducing the powdered lithium carbonate into such apparatus, lithium carbonate of a smaller particle size is advantageous in view of the reaction speed, but may cause declined air permeability to obstruct introduction of the chlorine gas into the center of the lithium carbonate bed, which may inhibit progress of the reaction. In order to avoid this, investigation was made on the relationship between the form of the lithium carbonate constituting the moving bed and the ratio of chlorination with the chlorine gas, to reveal that it was effective to granulate the lithium carbonate powder into granules. The particle size distribution of the granulated lithium carbonate may preferably be in the range of 0.1 to 5 mm. At less than 0.1 mm, the effect of granulation may not be exhibited sufficiently, and at more than 5 mm, not only the granulation per se but also introduction of the chlorine gas into the center of the resulting granules becomes hard. The particle size distribution may be controlled by means of a sieve after the granulation.

The granulation may be carried out by self-granulation, such as rolling, fluidized-bed, or stirring granulation, or by forced granulation, such as loosening, compression, extrusion, or dissolving granulation, among which extrusion granulation is preferred. The granulation may be carried out with an organic binder. In this case, the residual carbon will act as an additive for reduction reaction. The binder may alternatively be water, and then moisture needs to be removed sufficiently after the granulation.

The moisture content of the lithium carbonate in powder or granular form used as a raw material for step (A) may usually be not higher than 1 mass %, preferably not higher than 0.3 mass %. At higher moisture contents, the anhydrous lithium chloride powder generated in step (A) may be agglomerated and solidified into bulks as the temperature rises to some extent, even lower than the melting point. The bulks may cause hanging or decline of gas permeability in the reaction vessel, which may withhold the progress of reaction at a low chlorination ratio.

Figure 2:
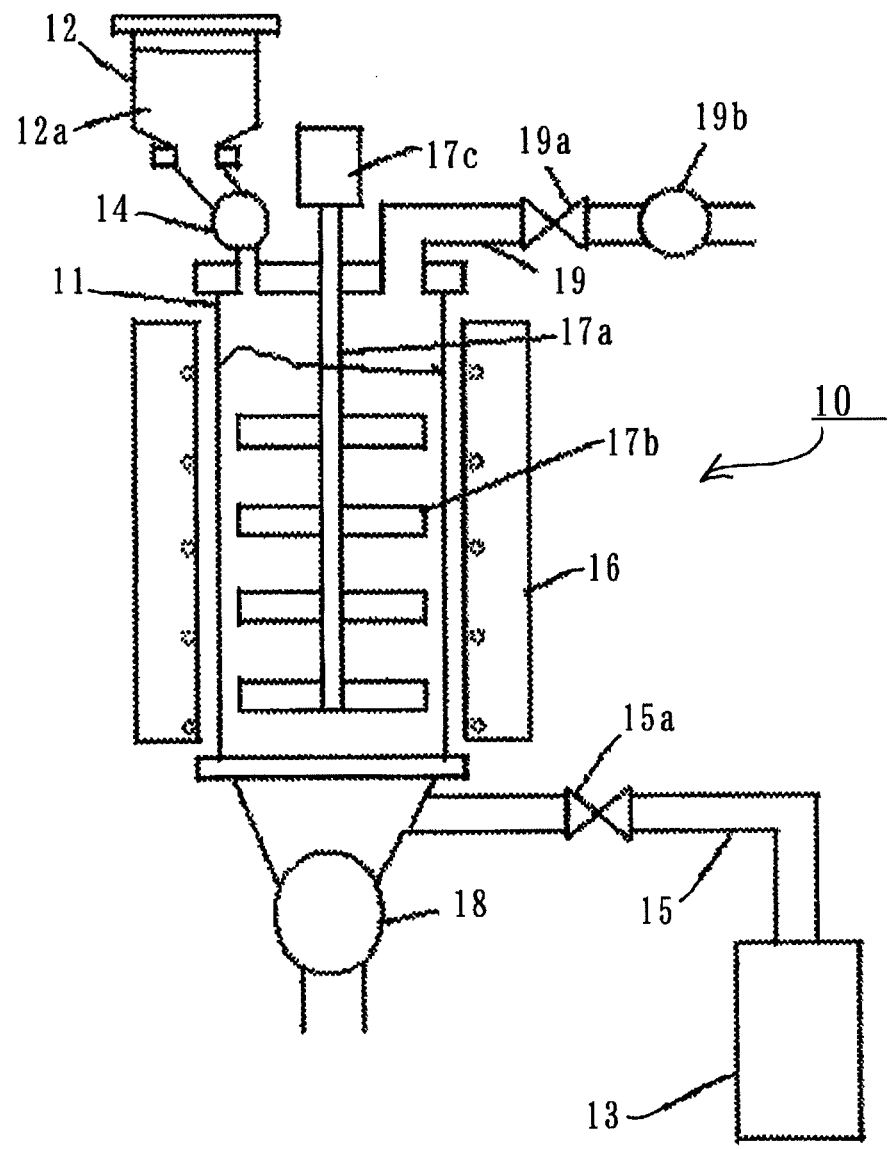
FIG. 2 is a sectional pattern diagram of an example of a system that may be used for the production of anhydrous lithium chloride in step (A) of the present invention.

Referring to FIG. 2, an example of a system in which step (A) alone may be performed for producing anhydrous lithium chloride will be explained.

FIG. 2 is a sectional pattern diagram of an example of a system in which step (A) may be performed for producing anhydrous lithium chloride. The system 10 includes a reaction vessel (chlorinating furnace) 11 for contacting and reacting lithium carbonate and chlorine gas in a dry process, a hopper 12 for reserving therein lithium carbonate 12a as a raw material, and a chlorine gas cylinder 13.

The reaction vessel 11 may be made of a material which is resistant to corrosion by hot chlorine gas, for example, Inconel (registered trademark), stainless steel, or mild steel lined with ceramics, such as alumina, silica, or mullite.

The hopper 12 is equipped with a rotary valve 14 for supplying the lithium carbonate into the reaction vessel 11, and is connected from above to the reaction vessel 11. The chlorine gas cylinder 13 is connected from below to the reaction vessel 11 via a duct 15 made of, for example, stainless steel and equipped with a valve 15a, for supplying the chlorine gas up into the reaction vessel 11.

The reaction vessel 11 is provided with an electric furnace 16 arranged therearound for controlling the reaction temperature, and a shaft 17a arranged therein having a plurality of stirring bars 17b for effecting the reaction under stirring, with the shaft 17a being connected to an external motor 17c. The stirring bars 17b may be of any shape, such as rod, plate, or vane, as long as the stirring may be effected.

Below the reaction vessel 11, a stainless steel rotary valve 18 is disposed for discharging the generated anhydrous lithium chloride out of the system. Above the reaction vessel 11, a duct 19 equipped with a valve 19a and a blower 19b is disposed for discharging the carbon dioxide gas and oxygen gas generated by the reaction out of the system. The duct 19 may be made of, for example, stainless steel, nickel-based alloys, or vinyl chloride.

Step (A) may be performed in the system 10 by supplying the lithium carbonate 12a in the hopper 12 down into the reaction vessel 11 while the chlorine gas from the chlorine gas cylinder 13 is supplied up into the reaction vessel 11, with the shaft 17a being rotated by the motor 17c and the temperature inside the reaction vessel 11 being controlled with the electric furnace 16, to thereby mix and react the lithium carbonate 12a and the chlorine gas under stirring.

Here, the lithium carbonate 12a contacts and reacts with the chlorine gas in a counterflow manner in the reaction vessel 11, and the resulting anhydrous lithium chloride is sequentially discharged out of the system via the rotary valve 18. The supply rate of the lithium carbonate 12a into the reaction vessel 11 is controlled by the rotary valve 14, whereas the supply rate of the chlorine gas is controlled by the valve 15a. Carbon dioxide gas and oxygen gas resulting from the reaction in the reaction vessel 11 are sucked by the blower 19b with the discharge rate being controlled with the valve 19a, and discharged out of the system.

The method of the present invention includes step (B) of subjecting the raw material for electrolysis including the anhydrous lithium chloride obtained from step (A) to molten salt electrolysis under such conditions as to produce lithium metal.

In step (B), the specific constructions of the electrolytic cell, the electrodes, and the electrolyte, as well as the specific operating conditions, such as cell voltage and current density, for the molten salt electrolysis, are conventionally well known, and may suitably be selected with reference to the conventional methods. In the Examples to be discussed later, an example of the conditions will be presented.

According to the method of the present invention, chlorine gas is generated by the molten salt electrolysis in step (B). By incorporating the generated chlorine gas as the chlorine gas used in step (A), steps (A) and (B) may be carried out continuously. That is, the chlorine gas generated by the molten salt electrolysis in step (B) is used in carrying out step (A) to generate anhydrous lithium chloride, which is in turn used in supplementing the electrolyte, which decreases with the progress of the electrolysis in step (B). In this way, steps (A) and (B) may be performed continuously. Here, given that lithium carbonate having the lithium weight equivalent to that of the anhydrous lithium chloride to be electrolyzed in step (B) is converted to anhydrous lithium chloride in step (A), which is then used as the raw material for the electrolysis in step (B), nominal electrolysis of lithium carbonate is achieved.

Yet the reaction occurred in the electrolytic cell is practically chloride electrolysis, so that problems encountered in the conventional carbonate electrolysis may be eliminated, such as anode consumption, black foam, and decline of yield due to reaction of the resulting lithium metal and lithium carbonate. In addition, use of inexpensive lithium carbonate as the raw material makes the method remarkably cost effective.

In the electrolysis operation, production control may require adjustment of the electrolytic current. The present system may flexibly respond to the change in operation by employing, as a part of the anhydrous lithium chloride to be supplemented to the system, anhydrous lithium chloride that has been prepared by a dry or wet method outside the electrolytic system, or by introducing additional chlorine gas from outside the electrolytic system to produce more anhydrous lithium chloride than that is consumed in the electrolysis.

In terms of the chlorine gas, the present invention allows in principle to form a closed system, so that costs for environmental protection may be reduced. The continuous electrolysis allows safe and efficient production of lithium metal without discharging the chlorine gas outside the system.

In the method for producing lithium metal according to the present invention, the anhydrous lithium chloride prepared in a dry process in step (A) is used as the raw material anhydrous lithium chloride for the electrolysis. When commercially available, ordinary anhydrous lithium chloride is used in the electrolysis, moisture is introduced into the electrolytic cell to cause generation of hydrogen gas, which leads to small explosion or abnormal combustion. Thus problems exist in safety, stability, and production efficiency of the electrolysis operation. On the contrary, the anhydrous lithium chloride prepared in step (A) of the present invention has an extremely low moisture content, and accordingly the electrolysis may be effected without the drawbacks mentioned above.

Figure 3:
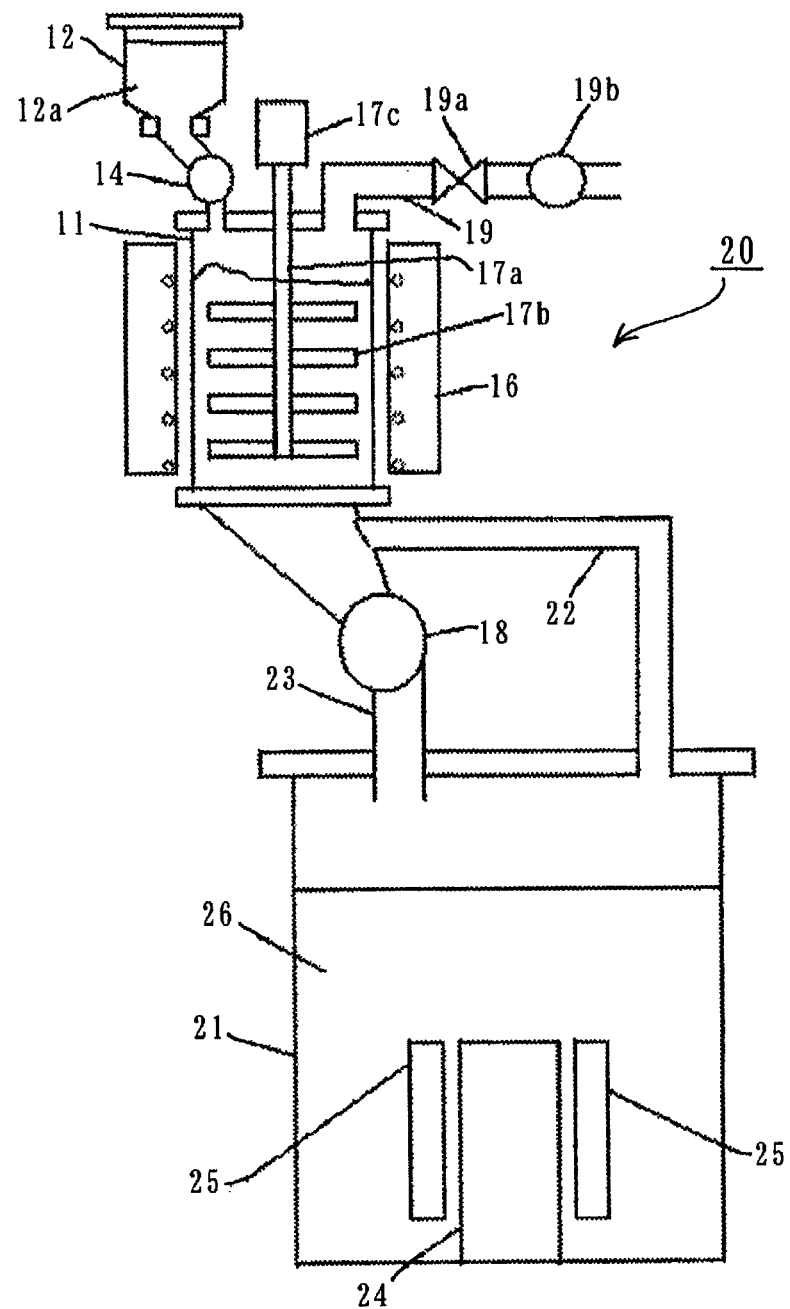
FIG. 3 is a sectional pattern diagram of an example of a system that may be used for practicing the method for producing lithium metal according to the present invention.

Referring to FIG. 3, an example of a system with which the method of the present invention may be performed by continuously carrying out steps (A) and (B), will now be discussed below. In the following, members already appeared in FIG. 2 are referred to by the same numbers as in FIG. 2, and further discussion is eliminated.

FIG. 3 is a sectional pattern diagram of an example of a system that may be used for continuously carrying out steps (A) and (B) to produce lithium metal. The system 20 is basically composed of the system 10 for carrying out step (A) as discussed with reference to FIG. 2, and a cell for lithium electrolysis 21 connected thereto. The system 10 has been modified by replacing the chlorine gas cylinder 13 with a chlorine gas transfer line 22 connecting the lower portion of the reaction vessel 11 and the cell for lithium electrolysis 21, and by providing a transfer line 23 made of stainless steel for transferring the anhydrous lithium chloride generated in the reaction vessel 11 to the cell for lithium electrolysis 21 via a rotary valve 18. Other members of the system 10 are the same as shown in FIG. 2.

Referring to FIG. 3, the cell for lithium electrolysis 21 may be a generally used Downs-type cell or a conversion thereof. The cell 21 is equipped with a graphite electrode as an anode 24 and an iron electrode as a cathode 25, and electrolyte 26 is introduced therein.

Steps (A) and (B) may be carried out continuously in the system 20 by producing anhydrous lithium chloride in the reaction vessel 11 as in the system 10, supplying the anhydrous lithium chloride through the rotary valve 18 and transfer line 23 into the electrolyte 26 in the cell for lithium electrolysis 21, and effecting electrolysis. For the continuous operation of steps (A) and (B), as the chlorine gas to be used in the reaction in the reaction vessel 11, the chlorine gas generated by the molten salt electrolysis in the cell for lithium electrolysis 21 is transferred to the reaction vessel 11 through the chlorine gas transfer line 22 during the reaction.

EXAMPLES

The present invention will now be explained in more detail with reference to Production Example and Example, which are not intended to restrict the present invention.

Production Example 1

Using the system 10 shown in FIG. 2, anhydrous lithium chloride was produced according to the following process.

Lithium carbonate in powder form of D90=0.04 mm was provided, kneaded with water, and granulated in an extrusion granulator. The granulated powder was dried to the moisture content of 0.3 mass %, to thereby obtain lithium carbonate 12a in granular form having the particle size distribution in the range of 0.8 to 1.2 mm.

Next, the lithium carbonate 12a was chlorinated with 3N chlorine gas supplied from the chlorine gas cylinder 13. The reaction vessel 11 was heated with the electric furnace 16 to create an area of 400° C. to 500° C. over about 1000 mm, wherein the chlorinating reaction was effected. The velocity of the moving bed was adjusted so that the residence time of the lithium carbonate 12a in this temperature area was not shorter than 2 hours. During the reaction, the supply rate of the lithium carbonate 12a from the hopper 12 was 3.5 kg/h in average, and the discharge rate of the anhydrous lithium chloride was 3.9 kg/h in average. By the operation for five days, 460 kg of anhydrous lithium chloride was recovered.

In the reaction mentioned above, the exhaust gas from the reaction vessel 11 was mainly composed of carbon dioxide and oxygen gases. The chlorination ratio from the carbonate to the chloride was maintained over 95%. Only slight hanging was occurred in the reaction vessel 11, and continuous operation was permitted. The resulting anhydrous lithium chloride had a moisture content of less than 0.1 mass %.

Example 1

In the system 20 shown in FIG. 3, anhydrous lithium chloride was produced in accordance with the following process.

The lithium carbonate 12a was produced in the same way as in Production Example 1.

In the cell for lithium electrolysis 21 in the system 20, molten salt electrolysis was performed at the current of 10 kA and at the temperature of 460° C., using an electrolyte composed of 35 to 45 mass % lithium chloride and 55 to 65 mass % potassium chloride, as the electrolyte 26. Production Example 1 was followed, except that the chlorine gas generated by the electrolysis was transferred to the reaction vessel 11 through the chlorine gas transfer line 22, and the chlorination reaction of the lithium carbonate 12a was carried out with the velocity of the moving bed being adjusted so that the residence time of the lithium carbonate 12a in the area at 400° C. to 500° C. was not shorter than 4 hours. During the reaction, the supply rate of the lithium carbonate 12a from the hopper 12 was 11.5 kg/h in average, the discharge rate of the anhydrous lithium chloride was 12.9 kg/h in average, and 2.1 kg/h in average of lithium metal was recovered from the cell for lithium electrolysis 21.

The exhaust gas mainly detected from the reaction vessel 11 was carbon dioxide and oxygen gases, and the chlorination ratio from the carbonate to the chloride was maintained over 95%. Only slight hanging was occurred in the reaction vessel 11, and continuous operation was permitted. The electrolysis in the cell for lithium electrolysis 21 was effected in the same way as the ordinary chloride electrolysis, the formation of black foam, which is characteristic of direct electrolysis of carbonate, was not observed, and remarkable consumption of the anode 24 (graphite anode) was not observed.

By this electrolysis for three months, 4.5 t of lithium metal was produced at the current efficiency of 89% and the working ratio of 92%. The obtained lithium metal was used as an anode foil of lithium primary battery, with no problem being observed.

What is claimed is:

1. A method for producing lithium metal comprising the steps of:
   (A) contacting and reacting solid lithium carbonate and chlorine gas in a counterflow manner without a solvent in a dry process to produce anhydrous lithium chloride; and
   (B) subjecting a raw material for electrolysis comprising said anhydrous lithium chloride obtained from step (A) to molten salt electrolysis in an electrolytic cell under such conditions as to produce lithium metal,
   wherein said step (A) is performed outside said electrolytic cell,
   wherein chlorine gas generated by said molten salt electrolysis in step (B) is recycled as said chlorine gas in step (A) performed outside said electrolytic cell to continuously perform steps (A) and (B),
   wherein said lithium carbonate is in the form of powder or granule prepared by granulating powder, and
   wherein said contacting and reacting in step (A) are carried out under stirring.

2. The method according to claim 1, wherein said contacting and reacting in step (A) are carried out at a temperature of not lower than 350° C. and lower than 506° C.

3. The method according to claim 1, wherein D90 (particle size at which cumulative volume fraction is 90%) of said lithium carbonate in powder form is not more than 0.70 mm.

4. The method according to claim 1, wherein particle size distribution of said lithium carbonate in granular form is in the range of 0.1 to 5 mm.

5. The method according to claim 1, wherein said lithium carbonate has a moisture content of not higher than 1 mass %.

6. The method according to claim 2, wherein said lithium carbonate has a moisture content of not higher than 1 mass %.

7. The method according to claim 3, wherein said lithium carbonate has a moisture content of not higher than 1 mass %.

8. The method according to claim 4, wherein said lithium carbonate has a moisture content of not higher than 1 mass %.

* * * * *